United States Patent
Daveloose et al.

(10) Patent No.: US 9,851,042 B2
(45) Date of Patent: Dec. 26, 2017

(54) LINING MATERIAL FOR PIPELINES

(75) Inventors: Frank Daveloose, Verviers (BE); Hugues Bolsee, Verviers (BE)

(73) Assignee: SEKISUI SPR AMERICAS LLC, Atlanta, GA (US)

(*) Notice: Subject to any disclaimer, the term of this patent is extended or adjusted under 35 U.S.C. 154(b) by 983 days.

(21) Appl. No.: 10/544,366

(22) PCT Filed: Oct. 31, 2003

(86) PCT No.: PCT/EP03/50776
§ 371 (c)(1),
(2), (4) Date: Jun. 5, 2006

(87) PCT Pub. No.: WO2004/106801
PCT Pub. Date: Dec. 9, 2004

(65) Prior Publication Data
US 2006/0228501 A1    Oct. 12, 2006

(30) Foreign Application Priority Data

Feb. 3, 2003   (EP) ................................... 03002310

(51) Int. Cl.
*F16L 55/165*    (2006.01)
(52) U.S. Cl.
CPC ..... *F16L 55/1656* (2013.01); *Y10T 428/1352* (2015.01)
(58) Field of Classification Search
CPC .................................................. F16L 55/1656
(Continued)

(56) References Cited

U.S. PATENT DOCUMENTS 642,537 A * 1/1900 Thoma .......................... 156/294
3,132,062 A 5/1964 Lang et al.
(Continued)

FOREIGN PATENT DOCUMENTS

| DE | 44 27 633 | 2/1995 |
| DE | 44 45 166 | 6/1996 |

(Continued)

OTHER PUBLICATIONS

Machine translation for Japan 06-249389 (no date).*
(Continued)

*Primary Examiner* — Steven D Maki
(74) *Attorney, Agent, or Firm* — Garvey, Smith & Nehrbass, Patent Attorneys, L.L.C.; Julia M. FitzPatrick; Charles C. Garvey, Jr.

(57) ABSTRACT

A tubular lining material for reinforcing pipelines, utilizable in a pipe-lining method wherein the tubular lining material, having a binder disposed on the inner surface thereof, is inserted into a pipeline and is allowed to advance within the pipeline as the tubular lining material is turned inside out under fluid pressure whereby the tubular lining material is applied to the inner surface of the pipeline with the binder being interposed between the pipeline and the tubular lining material, said tubular lining material including an outer layer of an impervious material and provided on the inside thereof with an inner reinforcing tubular jacket wherein the inner reinforcing tubular jacket includes at least two sheets of high tensile strength and/or high modulus fibers and wherein the sheets overlap at least two locations and wherein said overlap portions extend in the lengthwise direction of the inner tubular jacket.

31 Claims, 1 Drawing Sheet

(58) Field of Classification Search
USPC .......... 138/97, 98; 156/287, 294; 405/150.1,
405/154.1, 155, 184.2; 264/36.16, 36.17,
264/269, 516, 573; 428/34.7, 36.1, 36.2
See application file for complete search history.

(56) References Cited

U.S. PATENT DOCUMENTS

| | | | |
|---|---|---|---|
| 3,494,813 A | | 2/1970 | Lawrence et al. |
| 4,009,063 A | * | 2/1977 | Wood .......................... 156/294 |
| 4,334,943 A | | 6/1982 | Zenbayashi et al. |
| 4,350,548 A | | 9/1982 | Zenbayashi et al. |
| 4,368,091 A | | 1/1983 | Ontsuga et al. |
| 4,427,480 A | | 1/1984 | Kamuro et al. |
| 4,681,783 A | * | 7/1987 | Hyodo et al. ................. 428/36.1 |
| 5,077,107 A | * | 12/1991 | Kaneda et al. ............. 428/36.1 |
| 5,186,987 A | * | 2/1993 | Imoto et al. ................. 428/36.2 |
| 5,334,429 A | * | 8/1994 | Imoto et al. ................. 428/36.2 |
| 5,876,645 A | * | 3/1999 | Johnson ........................ 156/294 |
| 5,925,409 A | | 7/1999 | Nava |
| 6,196,271 B1 | * | 3/2001 | Braun et al. .................. 156/294 |
| 6,360,780 B1 | * | 3/2002 | Adolphs et al. ................ 138/98 |
| 6,612,340 B1 | * | 9/2003 | Lause ............................ 138/98 |
| 6,713,144 B2 | | 3/2004 | Bundo et al. |
| 2003/0099828 A1 | | 5/2003 | Bundo et al. |
| 2006/0228501 A1 | | 10/2006 | Daveloose et al. |

FOREIGN PATENT DOCUMENTS

| | | | |
|---|---|---|---|
| DE | 4445166 | * | 6/1996 |
| DE | 197 09 350 | | 5/1998 |
| DE | 19709350 | * | 5/1998 |
| DE | 19817413 A1 | | 10/1999 |
| EP | 275060 | * | 7/1988 |
| EP | 701086 | * | 3/1996 |
| EP | 789181 | | 8/1997 |
| EP | 0 860 645 | | 8/1998 |
| EP | 860645 | * | 8/1998 |
| EP | 1262708 A1 | | 12/2002 |
| JP | 56115213 A | | 9/1981 |
| JP | 06-249389 A | * | 9/1994 |
| JP | 2001-219471 | * | 8/2001 |
| JP | 2003039553 | | 2/2003 |
| JP | 2003048248 | | 2/2003 |
| WO | WO 91/14896 | | 10/1991 |

OTHER PUBLICATIONS

Machine translation for German 4,445,166 (no date).*
Machine translation for Europe 860,645 (no date).*
Machine translation for Japan 2001-219471 (no date).*
International Search Report; PCT/EP03/50776; Apr. 29, 2004.
EP International Search Report; PCT/EP2006/061754; Jun. 7, 2006.
JP2008507093 Examination Report dated Jan. 11, 2011.

* cited by examiner

LINING MATERIAL FOR PIPELINES

TECHNICAL FIELD OF INVENTION

The present invention relates to a lining material for pipelines, such as water, gas, or other fluids, which is capable of forming a lining thereof in the form of a strong inner pipe.

BRIEF DESCRIPTION OF RELATED ART

For a number of years, a tubular lining material was used for the purpose of repair and reinforcement of damaged or superannuated pipelines, which had been constructed and buried in the ground, since pipe-exchange works especially for underground pipelines involved much cost and difficulty. Pipe-lining methods developed at an early stage, for example, those disclosed in U.S. Pat. Nos. 3,132,062 and 3,494,813 were rather primitive and had a number of drawbacks in actual pipe-lining operations. Under the circumstances, various improvements were made in both pipe-lining methods and lining materials used therein.

Several improved lining methods have been proposed, for example, in U.S. Pat. Nos. 4,368,091, 4,334,943, 4,350,548; 4,427,480 and 4,334,943 have been noted as excellent methods for lining pipelines. According to these methods, a tubular lining material having a binder applied onto the inner surface thereof, is inserted into pipelines and allowed to advance therein while turning it inside out (evagination), whereby the lining material is bonded onto the inner surface of the pipelines with the binder.

In general, a lining material for pipelines is desirably provided on the inner surface thereof with an air-tight membrane or coating to impart water-proof and/or air impervious property to the lining material.

Various kinds of tubular lining materials have been used for relining pipes or pipelines. Usually the lining materials are made of felt and/or fabric and/or other porous, flexible or foamed material and have a water-proof and/or air impervious membrane or coating thereon.

The application of a tubular lining material is desired for the purpose of reinforcing pipelines for transporting a high pressure fluid, for example, a gas conduit, (up to 64 kg/cm$^2$ service pressure on actual use), a city water pipeline (up to 18 kg/cm$^2$ service pressure on actual use), etc.

In the case of the city water pipeline, a pipeline of city water grade is frequently used which originally has a pressure resistance as high as 30 kg/cm$^2$ but gradually deteriorates with the lapse of time so that its pressure resistance ultimately drops to a few kg/cm$^2$. Besides the pressure-resisting property, a strong resistance to cracking or destruction of the pipeline caused by external shock or loads, or even earthquakes, is also desired for such pipelines including city water pipelines. In the case of pipelines for a high pressure fluid, damages caused by the destruction of pipelines will be serious. Thus, a tubular lining material used for such pipelines is required to possess such function that it should not be destroyed and can be substituted for pipelines even if the pipelines become degraded or broken. Similarly, the tubular lining material alone should desirably maintain the function of a passageway for the high pressure fluids even if the pipelines are superannuated and significantly cracked or destroyed. In such a case the lining material alone should withstand the pressure of the transported fluid and the demand on the lining material will become severe especially if the diameter of the pipelines is large. If the pipelines are cracked or broken off due to a strong external force caused, for example, by an earthquake, the tubular lining could peel off from the damaged pipelines, without being destroyed itself in order, to maintain the function of a passageway for high pressure fluid.

The term "structural-resistance" used herein means the specific mechanical characteristics of the tubular lining material. In other words, the term "structural-resistance" is herein used to mean a combination of external loads-absorbing property and internal pressure resistance property which assume the function of a passageway for a high pressure fluids using only the tubular lining material when the pipelines are cracked or broken off. In order to furnish a tubular lining material with structural-resistance, the tubular lining material should possess a sufficiently high tenacity in both the lengthwise and the crosswise direction and a satisfactory resistance to such a degree that the lining material should not be broken down prior to external loads and/or shearing destruction forces from a binding loss between the pipelines and the lining material. In case the pipelines are buried in soft ground or reclaimed land, the pipeline may be cracked or broken off because of a dip in the ground or an earthquake. Even if the pipelines are cracked or broken off, the tubular lining material possessing structural-resistance can be split off from the damaged pipelines by shearing destruction of the solidified binder and can still function as a passageway for the high pressure fluid. Thus, the structural-resistance of the lining material is one of the most important characteristics, where in addition to a (very) high internal service pressure resistance, the renovated pipelines is buried where external loads could occur as well, and/or where there is soft ground or reclaimed land and/or in a district where earthquakes could be anticipated. In the prior art tubular lining materials, however, no consideration has been given to such structural-resistance.

As the tubular lining material is applied onto the inner surface of the pipelines by evagination, it is important that the tubular lining material should be flexible and do not require a high fluid pressure for the evagination operation. In general, the evagination operation becomes more difficult as the thickness of the tubular lining material becomes greater. Consequently, good flexibility is also required before curing, in addition to the structural resistance, for the cured tubular lining material.

U.S. Pat. No. 5,186,987 discloses a lining material for pipelines which comprises a flexible tubular film, a sheet covering the outer surface of the tubular film and a second film capable of being split off covering the outer surface of the sheet. The sheet is comprised of a fabric and a mat of fibers of high tenacity impregnated with a thickened liquid thermohardenable resin to form a fabric-fiber-reinforced composite thanks to the high tenacity sheet having a sufficient length and a width greater than the inner circumferential length of a pipeline to be treated. Both lateral end portions of the single high tenacity sheet are slidably overlapped with each other to form a tube around the tubular film, the outer circumferential length of the tube being shorter than the inner circumferential length of the pipeline. When the lining material inserted into the pipeline is inflated to bring the lining material evenly into intimate contact with the inner surface of the pipeline, the overlapping section of the lining slides over one another and the circumferential length of the lining material expands so that the lining material comes in tight contact with the pipeline.

WO91/14896 discloses a similar tubular lining material as described in U.S. Pat. No. 5,186,987 with one or more layers of resin absorbent, reinforcement material which overlap at one location per layer. Upon inflating the lining material the reinforcement layers will slip in their respective overlapping section to enable the reinforcing layers to expand.

DE 44 45 166 also describes a similar tubular lining material as disclosed in U.S. Pat. No. 5,186,987 with several layers of resin absorbent, reinforcement material which overlap at one location per layer. The overlapping sections of each layer are offset relative to each other. Upon inflating the lining material the reinforcement layers will slip in their respective overlapping section to enable the reinforcing layers to expand.

DE 44 27 633 also describes a similar tubular lining material with several layers of resin absorbent, reinforcement material which overlap at one location per layer. The overlapping sections of each layer are offset relative to each other. The lining material further comprises two non-overlapping exterior layers of reinforcement material covering only a part of the circumference of the lining material. These two exterior layers of reinforcement material are bonded at certain locations to the envelope of the tubular lining material.

However, the expansion of the circumferential length of the lining material is limited and a rather strong pressure may be required to overcome the frictional resistance of the lining material in the overlapping section.

BRIEF SUMMARY OF THE INVENTION

The invention provides a new type of lining material for pipelines which can be evenly applied onto the inner surface of the pipelines and is capable of forming a strong composite lining.

In order to overcome the above-mentioned problems, the present invention proposes a tubular lining material for reinforcing pipelines, utilizable in a pipelining method. This tubular lining material, having a binder disposed on the inner surface thereof, is inserted into a pipeline and is allowed to advance within the pipeline as the tubular lining material is turned inside out under fluid pressure whereby the tubular lining material is applied to the inner surface of the pipeline with the binder being interposed between the pipeline and the tubular lining material. Said material is provided on the inside thereof with a reinforcing inner tubular jacket, wherein the inner reinforcing tubular jacket comprises at least two sheets of high strength and high modulus fibers and wherein the sheets overlap at least two locations and wherein said overlap portion extends in the lengthwise direction of the inner tubular jacket.

The proposed tubular lining material for reinforcing pipelines possesses a good binder absorption capacity, remains very flexible before curing for easy evagination, and has good circumferential expansion properties in order to fit the host pipe.

After the curing of the binder, the lining material becomes firm, shape stable and its structural-resistance and pressure-resistance is sufficient enough to maintain itself as having the function of a passageway even if the pipelines or joint parts thereof are cracked or broken off and if the tubular lining material is peeled off from the pipelines or joint parts thereof by an external force stronger than the bonding strength of the binder used.

One other advantage of the lining material according to the invention is that its circumferential expansion requires only a low pressure to overcome the overlap slipping needs.

The presence of at least two overlapped portions greatly enhances the expansion capacity because the expansion may take place at two separate locations and allows designing the tubular lining with a rather small initial circumferential size. The risk of wrinkle formation during relining is minimized or even avoided.

Furthermore, if, according to a preferred embodiment, the overlaps are extending across the two opposite edges of the flattened tubular lining material, even after diameter expansion, the previous flattening folds will remain in the double layer overlap zones.

One advantage of this embodiment is that the two overlaps extending across the two opposite edges of the flattened tubular allow to keep the total thickness, flexibility and weight of the lining material on rather low level in addition to an optimal homogeneous resistance of the composite material after impregnation and curing. This characteristic lead to an important saving of resin and makes this lining material more competitive and easier to process.

Thanks to those double layer reinforced zones covering the flattening folds, the negative effects of the physical folding on the high strength/high modulus textile material is overcome, and the tubular lining preserves its structural performances around its entire circumference, in spite of the use of folding and shearing sensitive reinforcement fibers or yarns into the composite structure.

Indeed, it has been found that lining materials such as disclosed in U.S. Pat. No. 5,186,987, with only one single overlap portion do not withstand very high pressures even when a high strength/high modulus fabric is used in the lining material.

Surprisingly, the lining material with two diametrically opposed high strength and high modulus fabric or mat overlap sections however has a much higher pressure resistance than a comparable lining material which has only one overlap section.

This surprising effect seems to be due to the fact that the lining material is folded during production, then stored and transported in a flattened state. Only when the lining material is introduced into the pipeline and applied to the inner surface of the pipeline, it returns to its round shape. It has been found that the high tensile strength and high modulus fibers used in the reinforcing inner tubular jacket have a tendency to break when the lining material is flattened. The fact that the reinforcing inner tubular jacket comprises at least two sheets or mats of high tensile strength and high modulus fibers or yarns, which overlap in the lengthwise direction at the locations where the lining material is folded, increases the number of fibers that are still intact dramatically and thus increases the structural strength and the pressure resistance of the cured lining material.

For example, a bursting test was carried on with a free 1.20 m long and DN 400 mm impregnated and cured lining. This lining was constructed with a 6.25 mm thick polyester coated felt, and a flat reinforcing E-CR glass fabric of 1500 $g/m^2$ (500 $g/m^2$ in warp & 1000 $g/m^2$ in weft), shaped to make a channel with a single overlapped zone outside the lateral folding edges. The short term bursting pressure was 16 bars allowing a long term service pressure of +/−5.3 bars (long term resistance=½ short term resistance, and security coefficient=1.5).

With the same design, but where glass material channel was constructed with two separate layers of glass fabric, overlapping astride the folding edges areas on 160 mm, the short term bursting pressure was 37.5 bars, allowing a long term service pressure of 12.5 bars The at least two sheets of fabrics or mats of high tensile strength and high modulus material overlap preferably by at least 5 cm each.

Advantageously, especially when "DN" is bigger than 320 mm, the at least two sheets of fabrics or mats of high tensile strength and high modulus material overlap from about 2×0.10 DN (nominal diameter) to about 2×0.30 DN each, and most preferably by about 2×0.20 DN each, according the size of the liner in comparison with the pipeline diameter. Those skilled in the art will be able to determine the optimal value of the overlapping depending on the diameter of the pipeline to be renovated, by its expected service pressure, the type and quality of the sheets or mats, and the expected tubular lining expansion during implementation.

According to a further preferred embodiment, the tubular lining material further comprises either a flexible tubular jacket between the air-impervious outer layer and the inner reinforcing tubular jacket or a flexible tubular jacket on the inner reinforcing tubular jacket or a first flexible tubular jacket between the air-impervious outer layer and the inner reinforcing tubular jacket and a second flexible tubular jacket on the inner reinforcing tubular jacket.

This flexible tubular jacket preferably comprises a rather stretchable textile structure like a non-woven web or felt, a knitted layer, or an elastic woven fabric.

More particularly, the flexible tubular jacket(s) comprise(s) a textile non woven felt, a spunbonded mat or fleece, or a woven, braided or knitted textile structure or flexible, porous and absorbent layer such as an open cells foam.

The impervious material of the outer layer comprises preferably an elastomeric or flexible natural or synthetic material, which is chosen among the group consisting of natural and synthetic rubbers, polyester elastic polymers, polyolefin polymers, polyolefin copolymers, a polyurethane polymers or a mixture thereof. Preferably these materials are "food approved" materials.

Depending on the destination of the lining material, the outer layer is air impervious and/or watertight.

Generally, the outer layer has a thickness within the range of 0.2-2.0 mm, preferably 0.5-1.5 mm.

The inner reinforcing tubular jacket and the optional flexible tubular jacket(s) is (are) preferably impregnated with a binder creating a hard composite material after curing or drying.

The binder may comprise a resin or a glue chosen from the group consisting of a heat setting or cold curing hardening material such as polyurethane, unsaturated polyester, vinyl ester, epoxy, acrylics, isocyanate, concrete or water glass or a mixture thereof.

The binder binds the overlapping edges of the high strength and high modulus reinforcing sheets after curing or drying.

According to a preferred embodiment, the at least two sheets of high tensile strength and high modulus material comprise a woven, braided or knitted structure or mat or a non woven sheet made of glass, para aramide, carbon or other high modulus fibers or yarns.

Preferably the high strength and high modulus material is chosen in order to overcome to a certain extend the loss of strength due to the folding operation during the tubular lining manufacturing process. "E" or "E-CR" Glass fiber and "E" or "E-CR" glass filaments having individual cross section of maximum 17 microns and selected sizing agent for epoxy resin compatibility are well suited for this application. Para aramide fibers and filaments sold under the trademarks Kevlar®, Twaron® or Technora® or carbon fibers and filaments could also be used.

Other objects, features and advantages of the present invention will become apparent more fully from the following description.

BRIEF DESCRIPTION OF THE DRAWINGS

The present invention can more fully be understood from the following description taken in conjunction with accompanying drawings in which.

DETAILED DESCRIPTION OF THE INVENTION

Figure 1:
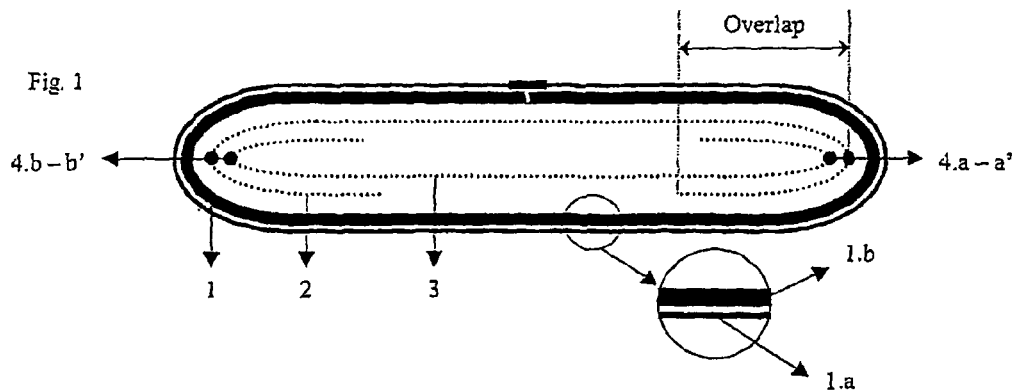
FIG. 1. shows a cross section of a structural lining material before reversion

FIG. 1 shows a cross section of a structural lining material before reversion, comprising a flexible multilayer structure manufactured to be used for relining pipelines. This lining material is designed for structural reinforcement of a pipeline after impregnation with a hardenable resin or binder, evagination and curing inside the pipeline to be renovated.

The external layer 1 is made of an air-impervious coating material 1.a. applied on the outer surface of a flexible porous and absorbent substrate 1.b. The flexible porous and absorbent substrate 1b is most usually made of a non woven textile structure such as felt, mat, spun bond or web with continuous filaments or staple fibers. In some cases, it may also be a woven, braided or knitted structure; or any other kind of flexible porous absorbent material like an open cells foam. When a textile material is used for the porous, absorbent layer, synthetic or artificial fibers or filaments like polyamide, polyolefin, acrylics, glass, rayon, aramides or most usually polyester are used. In certain cases natural fibers, especially from vegetal origin, like flax, hemp, jute, kenaf or ramie may be used as well. The construction and the thickness of the flexible porous layer 1 is designed in accordance with the specific requirements, in relation to international standards, like ASTM F.1216, in order to guaranty the structural reinforcement of the total composite lining in relation to the mechanical properties (E Modulus) of the resin or binder used for the impregnation.

For example: A partly deteriorated pipe in DN=500 mm with an ovality reduction factor of 2%, submitted to a 1.5 m water column, and taking in account a ground enhancement factor K=7.0 and a factor of safety N=1.5 renewed with a composite lining material having a short term E-Modulus=3500 Mpa need a layer of min. 5 mm.

The flexible porous and absorbent substrate 1 may be made of a single layer or of several layers of the same or from different material.

Inside this flexible porous and absorbent substrate, two separate sheets of high strength and high modulus textile material 2 & 3 are placed and folded with free overlaps on both edges in order to form an internal channel. The two overlaps are placed opposite to each other, creating a double layer of material along the length of the lining material. The double layers are placed so as to cover the flattened edges of the lining 4a-a' and 4b-b'.

The two sheets of high strength and high modulus material 2 & 3 may be made of non woven or woven, braided or knitted structures using staple fibers, continuous filaments or yarns. Structures like woven or warp and weft knitted fabrics, where longitudinal and cross yarns or filaments are in a perpendicular direction are preferably used. This arrangement allows to obtain a maximum reinforcement effect as far as the internal pressure resistance of the structural lining material is concerned. In practice continuous, high strength and high modulus multifilament yarns are used in sheets 2 & 3 where the warp yarns are in the longitudinal direction of the lining material and the weft yarns in the crosswise direction. Construction of the sheets 2 & 3 is designed in order to reach a tensile breaking strength twice as high for the crosswise direction as compared to the lengthwise direction. An optimal bursting pressure for the final structural lining material is thus assured.

Sheets 2 and 3 are made of high strength and high modulus material like carbon, para aramide, high performance polyethylene (HPPE) and for economical reasons preferably of glass.

When glass is used for sheets 2 & 3, the chemically and mechanically most resistant grades are selected in order to assume long term performance and to minimize the loss of strength during the lining manufacturing process and during storage. In this respect E Glass or preferably E-CR Glass, or Boron free grades are preferably selected.

Sheets 2 & 3 are normally made of the same kind of fiber or yarn, but different materials may also be combined.

Overlap location and widths on sheets 2 & 3 are normally equal on both side, but may be different.

Figure 2:
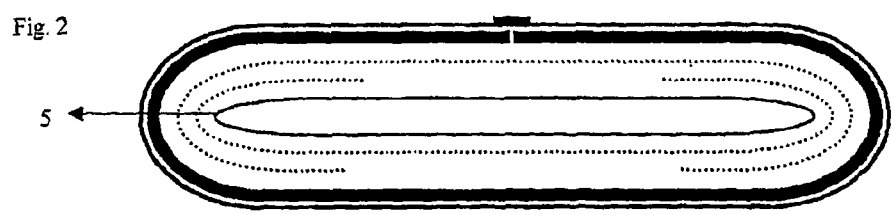
FIG. 2. shows a crosssection through a prefered embodiment of a structural lining material before reversion.

FIG. 2. shows a crosssection through a prefeered embodiment of a structural lining material before reversion.

Additional tubular layer(s) of flexible, porous and absorbent material 5 may be inserted inside the channel constructed with sheets 2 & 3.

Such layer(s) is usually similar to the porous absorbent substrate 1.*b*. However, It may also be a water-proof and/or air impervious layer able to protect the heat setting resin or binder against wetting during implementation in the host pipe.

Figure 3:
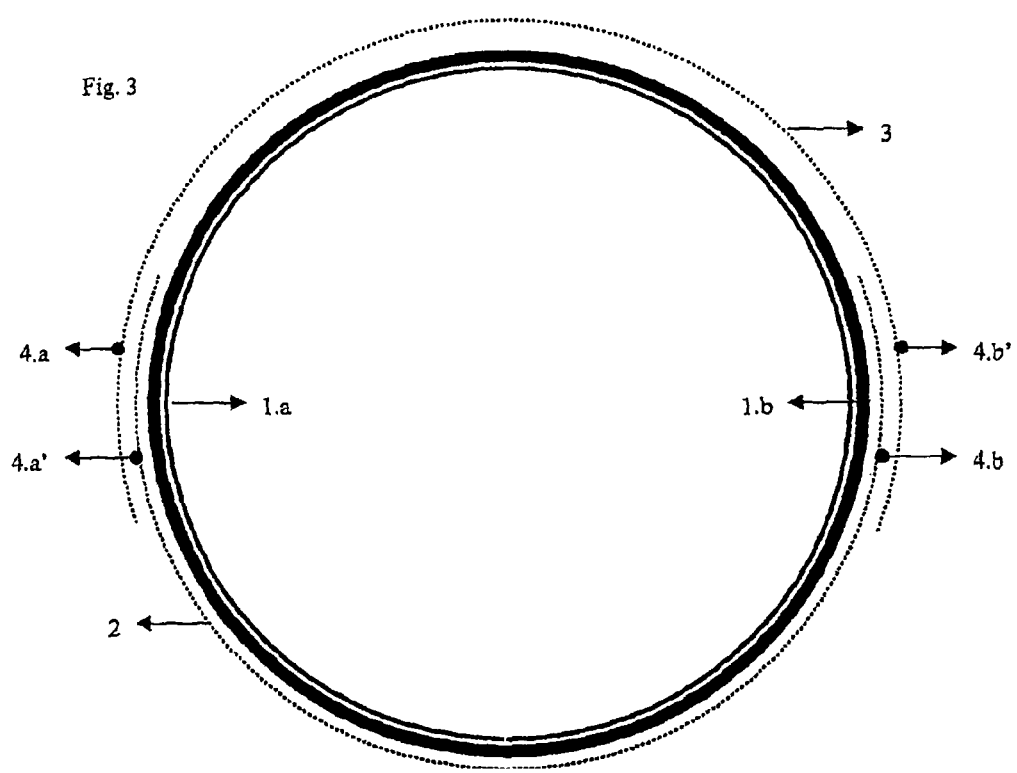
FIG. 3: cross section of a structural lining material after reversion.

FIG. 3: is a cross section of a structural lining material after reversion,

After reversion, layer 1 is turned inside the lining material with its water-tight coated face 1.*a*. in contact with the fluid to be carried in the renovated pipe.

After curing of the heat setting resin or binder, the layer(s) 1.*b*.contribute in a major way to the structural reinforcement of the lining material, due to its design thickness and E-modulus.

The two sheets of high strength and high modulus textile material 2 & 3, are now around the inner tube 1, and are still overlapped on their edges to reinforce the previous folded zones 4*a*-*a*' and 4*b*-*b*'. It is the heat setting resin or binder which assumes after curing by mean of steam, hot air, hot water or UV light, the firm connection between the two overlapped areas and creates a reinforced, pressure resistant, composite tube.

Thanks to the high strength and high modulus reinforcement sheets 2 & 3, the cured lining is able to resist to high internal pressure and to maintain its size and shape in such conditions.

Unlike the prior art cured in place linings, this specific high modulus structural construction allows the lining material to accurately fit the renovated pipeline and also to restrain the pressure inside the composite lining itself.

Thanks to those specific properties, sensitive and/or damage host pipe are preserved against pressure forces after such structural relining.

On application of the tubular lining material of this invention onto the inner surface of pipelines according to any suitable pipe-lining method disclosed, for example, in U.S. Pat. No. 4,334,943, the tubular lining material is impregnated on the inner surface thereof with a sufficient amount of the binder held in the porous flexible layer and to secure integral bonding of the different reinforcement sheets of the tubular lining material, and to bind it onto the inner surface of the pipelines. Various kinds of binders can be used like unsaturated polyester, vinyl ester but those of epoxy type are preferable. In case the binder is an epoxy type is used, an aromatic or aliphatic poly-amine may be selected as a curing agent.

The construction of the tubular lining material of the present invention will now be illustrated in more detail by way of a specific example with respect to the tubular lining material for a conduit working at a service pressure of 15 bars under a 6 meter water column, and having a nominal diameter of 400 mm:

The air-impervious tubular jacket is manufactured with a 7 mm thick flat non woven polyester felt of 1400 g/m$^2$ coated with a 1 mm air impervious layer of polyethylene (LLDPE). After cutting at the width of 1159 mm, the coated felt is shaped and bonded in order to realize a hose, inside witch two layers 788 mm wide each of 1500 g/m$^2$ woven glass fabric are folded and create an internal tube with their two edges overlapping on the full length on a minimum width of 80 mm across the folds off the flattened lining.

The glass fabrics are made of 100% continuous multi-filament Boron free yarns treated with an abrasion resistant, epoxy-compatible sizing agent.

The lining material is then impregnated with 10.35 kg/m$^2$ of an epoxy resin containing an aliphatic polyamine hardener.

After evagination with compressed air, in the pipe to be renewed, steam is circulated in contact with the internal coated face of the reverted lining during 5 hours at a temperature of 85 to 90° C. After complete curing of the resin, the air pressure in maintained until cooling up to 30° C. The lining is then able to assume a 38 bars (short term) bursting pressure, and an external load corresponding to 6 meters water table.

As many apparently widely different embodiments of the present invention may be made without departing from the spirit and scope thereof, it is to be construed that the present invention is not limited to the specific embodiments thereof except as defined in the appended claims.

The invention claimed is:

1. A tubular lining for reinforcing pipelines comprising:
   a) a lining material having two configurations including a pre-reversion configuration and a post-reversion configuration, wherein said lining material in the pre-reversion configuration is capable of being turned inside out so as to obtain the post-reversion configuration, said lining material including:
   a layer of an impervious material and a reinforcing tubular jacket;
   b) said reinforcing tubular jacket including first and second fabric sheets of high tensile strength and/or high modulus fibers, said first fabric sheet having two spaced apart first sheet edges, said second fabric sheet having two spaced apart second sheet edges;
   c) wherein said first and second fabric sheets overlap at two overlap locations;
   d) the two overlap locations including a first sheet overlap wherein a length of the first sheet overlaps a length of the second sheet such that a surface of one of the first sheet edges is adjacent a surface of the second sheet;
   e) said two overlap locations including a second sheet overlap that is spaced away from the first sheet overlap, wherein a length of the first sheet overlaps a length of the second sheet such that a surface of the other of the first sheet edges is adjacent a surface of the second sheet, and wherein the first sheet overlap and second sheet overlap are situated at diametrically opposed locations;
f) wherein a length of the first sheet extends between the two overlap locations;
g) wherein a length of the second sheet extends between the two overlap locations;
h) wherein in said pre-reversion configuration each of the sheets is folded only at the two sheet overlap locations, forming a fold at each overlap location and a substantially flat configuration of the lining material;
i) the overlap locations permitting expansion to take place during installation wherein the lining moves from the pre-reversion configuration to the post-reversion configuration while limiting pressure required to achieve slipping needed to achieve expansion from an initial circumferential size, with the overlap locations also extending sufficiently in an expanded configuration so that the overlap locations provide reinforcement of the lining allowing fibers to remain intact at the two folds when the lining is in the pre-reversion configuration and moving to the post-reversion configuration;
j) said reinforcing tubular jacket disposed at a relative interior of said layer of impervious material in said pre-reversion configuration; and
k) said reinforcing tubular jacket disposed at a relative exterior of said layer of impervious material in said post-reversion configuration.

2. The tubular lining of claim 1, wherein the first and second fabric sheets of high tensile strength and/or high modulus fibers overlap by at least 5 cm.

3. A tubular lining according to claim 1 wherein the first and second fabric sheets of high tensile strength and/or high modulus material overlap at each overlap location by a distance between 2×0.10 ND and 2×0.30 ND, wherein ND is a nominal diameter of the tubular lining.

4. A tubular lining according to claim 1, wherein the tubular lining further comprises flexible tubular jacket between the layer of impervious material and the reinforcing tubular jacket in said pre-reversion configuration.

5. A tubular lining according to claim 1, wherein the tubular lining further comprises a flexible tubular jacket on the reinforcing tubular jacket.

6. A tubular lining according to claim 1, wherein the tubular lining further comprises a first flexible tubular jacket between the layer of impervious material and the reinforcing tubular jacket in said pre-reversion configuration and a second flexible tubular jacket on the reinforcing tubular jacket.

7. A tubular lining according to claim 4 wherein the flexible tubular jacket comprises a textile non woven felt, a spunbonded mat or fleece, or a woven, braided or knitted textile structure or a flexible, porous and absorbent layer.

8. A tubular lining according to claim 1, wherein the impervious material comprises an elastomeric or flexible natural or synthetic material.

9. A tubular lining according to claim 8, wherein the layer of impervious material is chosen from the group consisting of natural and synthetic rubbers, polyester elastic polymers, polyolefin polymers, polyolefin copolymers, polyurethane polymers, and a mixture thereof.

10. A tubular lining according to claim 1, wherein the layer of impervious material is air impervious and/or water tight.

11. A tubular lining according to claim 1, wherein the layer of impervious material has a thickness within the range of 0.2-2.0 mm.

12. A tubular lining according to claim 5, wherein the reinforcing tubular jacket and the flexible tubular jacket(s) are impregnated with a binder creating a hard composite material after curing or drying.

13. A tubular lining according to claim 12, wherein the binder comprises a resin or a glue comprising a heat setting or cold curing hardening material.

14. A tubular lining according to claim 12 wherein the binder binds overlapping first and second sheet edges of the high strength and high modulus reinforcing sheets after curing or drying.

15. A tubular lining according to claim 1 wherein the high strength and high modulus sheets comprise a non woven, a woven, a braided or a knitted structure or mat of glass, para aramide, carbon, or high modulus fibers or yarns.

16. A tubular lining according to claim 15 wherein the fibers or yarns comprise continuous multifilaments of glass.

17. A tubular lining according to claim 13, wherein the heat setting or cold curing hardening material is selected from a group comprising polyurethane, unsaturated polyester, vinyl ester, epoxy, acrylics, isocyanate, concrete, and water glass.

18. A tubular lining according to claim 16 wherein the continuous multifilaments of glass comprise E E-CR and/or Boron free glass.

19. A method for reinforcing pipelines with a tubular lining, the method comprising:
   a) inserting a tubular lining comprising a lining material having a pre-reversion configuration and a post-reversion configuration wherein said lining material in the pre-reversion configuration is capable of being turned inside out so as to obtain the post-reversion configuration, the tubular lining structured for a reversion into a pipeline having an inner surface, said tubular lining including:
      i) a layer of an impervious material at an exterior circumference of the tubular lining in the pre-reversion configuration;
      ii) a reinforcing tubular jacket having first and second sheets of high tensile strength and/or high modulus fibers, said first sheet having two spaced apart first sheet edges, said second sheet having two spaced apart second sheet edges;
      iii) wherein said first and second sheets overlap at two locations;
      iv) the two overlap locations including a first sheet overlap wherein a length of the first sheet overlaps a length of the second sheet such that a surface of one of the first sheet edges is adjacent a surface of the second sheet;
      v) said two overlap locations including a second sheet overlap that is spaced away from the first sheet overlap, said second sheet overlap including a length of the first sheet that overlaps a length of the second sheet such that a surface of the other of the first sheet edges is adjacent a surface of the second sheet;
      vi) wherein a length of the first sheet extends between the two overlap locations;
      vii) wherein a length of the second sheet extends between the two overlap locations, and wherein the two overlap locations are situated at diametrically opposed locations of the tubular lining; and
      viii) the two overlap locations permitting expansion to take place during installation wherein the lining moves from the pre-reversion configuration to the post-reversion configuration;

ix) wherein in said pre-reversion configuration each of the sheets is folded only at the two sheet overlap locations, forming a fold at each of the overlap locations and a substantially flat configuration of the lining, the said sheet overlap locations providing reinforcement for the lining at the said folds, enabling fibers to remain intact at the said folds when the tubular lining is in the pre-reversion configuration and when the tubular lining in the pre-reversion configuration is moving to the post-reversion configuration;

b) disposing said reinforcing tubular jacket at a relative interior of said layer of impervious material prior to said reversion;

c) performing a reversion of the tubular lining via fluid pressure, resulting in the post-reversion configuration and application of the tubular lining material to an inner surface of the pipeline with a binder interposed between the pipeline and the tubular lining material;

d) disposing said reinforcing tubular jacket at a relative exterior of said layer of impervious material in the post-reversion configuration via said reversion; and e) advancing the tubular lining within the pipeline via said performing of said reversion.

20. A tubular lining for reinforcing a pipeline comprising:
a) a lining having two configurations, a pre-reversion configuration and a post-reversion configuration, wherein said lining in the pre-reversion configuration is operable to be turned inside out so as to obtain the post-reversion configuration;
b) the pre-reversion configuration of the lining including:
  i) an outer layer having an outer circumference, wherein the outer layer is made of an absorbent material, has an absorbent interior surface, and has a waterproof and/or air impervious coating on an exterior surface of the outer layer;
  ii) a reinforcing tubular jacket of high tensile strength and/or high modulus fibers positioned within the outer layer;
  iii) the reinforcing tubular jacket having a first jacket layer with an upper surface, a lower surface, and first and second ends, wherein the first end is folded over the upper surface and extends a first distance towards the second end, and the second end is folded over the upper surface and extends a second distance towards the first end, and wherein the first and second ends do not touch and are free ends;
  iv) the reinforcing tubular jacket having a second jacket layer having a third end and a fourth end, the second jacket layer partially encircling the first jacket layer and positioned above the first and second ends with the third end folded to extend a third distance under the lower surface of the first jacket layer and the fourth end folded to extend a fourth distance under the lower surface of the first jacket layer, and wherein the third and fourth ends do not touch and are free ends;
  v) the reinforcing tubular jacket having opposing overlapped areas in the pre-reversion configuration that are diametrically opposed, each of the opposing overlapped areas including four layers of material, and the reinforcing tubular jacket having an area in between said opposing overlapped areas that has two layers of material; and
  vi) wherein in said pre-reversion configuration each of the reinforcing tubular first and second jacket layers is folded at the opposed overlapped areas, forming a fold at each of the overlapped areas in a generally flat configuration of the lining, wherein the opposed overlapped areas provide reinforcement for the reinforcing tubular jacket when folded; and
c) the post-reversion configuration of the lining including the outer layer surrounded by the reinforcing tubular jacket that includes the opposed overlap areas, and wherein the waterproof and/or air impervious exterior surface of the outer layer is an innermost layer in the post-reversion configuration.

21. The tubular lining of claim 20 further comprising a continuous inner layer or layers of absorbent material having an inner circumference and positioned within the outer layer, the reinforcing tubular jacket positioned between the outer layer and the inner layer, wherein the first distance of the first jacket layer partially extends over the inner layer and wherein the second distance of the first jacket layer partially extends over the inner layer so that the first jacket layer partially encircles the inner layer.

22. The tubular lining of claim 20 wherein the absorbent interior surface of the outer layer and the reinforcing tubular jacket includes a binder.

23. The tubular lining of claim 21 wherein the interior surface of the outer layer, reinforcing tubular jacket and the inner layer include a binder.

24. The tubular lining of claim 23 wherein in the post-reversion configuration, the inner layer becomes the outer layer of the tubular lining and is hardened after curing, and wherein overlapped first and third ends of the reinforcing jacket are bound together after curing, and overlapped second and fourth ends of the reinforcing jacket are bound together after curing.

25. The tubular lining of claim 24 wherein in the post-reversion configuration, the waterproof and/or air impervious coating on the outer layer becomes an interior surface of the tubular lining.

26. The tubular lining of claim 25 wherein the waterproof and/or air impervious coating is a food approved coating.

27. The tubular lining of claim 20 wherein the waterproof and/or air impervious coating is an elastomeric, flexible natural or synthetic material.

28. A tubular lining for reinforcing a pipeline comprising:
a) a lining having two configurations, a pre-reversion configuration and a post-reversion configuration, wherein said lining in the pre-reversion configuration is operable to be turned inside out so as to obtain the post-reversion configuration;
b) the pre-reversion configuration including,
  i) an absorbent outer layer having an outer circumference in the pre-reversion configuration, the absorbent outer layer having a waterproof and/or air impervious coating on an exterior surface of the outer layer;
  ii) an absorbent inner layer having an inner circumference;
  iii) a reinforcing tubular jacket of high tensile strength and/or high modulus fibers positioned between the outer layer and encircling the inner layer, the reinforcing tubular jacket having diametrically opposed overlap locations;
  iv) the reinforcing tubular jacket having a first jacket layer that partially encircles the inner layer, the first jacket layer having an upper surface, a lower surface, and first and second ends, wherein the first end is folded over the upper surface and over the inner layer extending a first distance towards the second end, wherein the second end is folded over the upper surface and over the inner layer extending a second distance towards the first end, and wherein the first and second ends do not make contact with one another;

v) the reinforcing tubular jacket having a second jacket layer having third and fourth ends, wherein the second jacket layer partially encircles the first jacket layer, the second jacket layer positioned above the first and second ends of the first jacket layer with the third end folded to extend a third distance under the lower surface of the first jacket layer and under the inner layer, and the fourth end folded to extend a fourth distance under the lower surface of the first jacket layer and under the inner layer, and wherein the third and fourth ends do not make contact with one another; and vi) the reinforcing tubular jacket having diametrically opposing overlapped areas, one of the opposing overlapped areas including the first and third ends and the other of the opposing overlapped areas including the second and fourth ends;

vii) a binder on an absorbent interior surface of the outer layer, on the inner layer and on the reinforcing tubular jacket; and (c) the post-reversion configuration of the lining including the outer layer surrounded by the reinforcing tubular jacket that includes opposing overlap areas, and the reinforcing tubular jacket surrounded by the inner layer, and wherein the waterproof and/or air impervious exterior surface of the outer layer is an innermost layer in the post reversion configuration.

29. A method of reinforcing a pipe comprising:
a) providing a tubular lining that has two configurations, a pre-reversion configuration and a post-reversion configuration, said tubular lining including in the pre-reversion configuration:
   i) an absorbent outer layer having an outer circumference, the absorbent outer layer having a waterproof and/or air impervious coating on an exterior surface of the outer layer;
   ii) an absorbent inner layer having an inner circumference;
   iii) a reinforcing tubular jacket of high tensile strength and/or high modulus fibers positioned between the outer layer and the inner layer, the reinforcing tubular jacket encircling the inner layer;
   iv) the reinforcing tubular jacket having a first jacket layer that partially encircles the inner layer with first and second free ends that do not make contact, and a second jacket layer that partially encircles the first jacket layer with third and fourth free ends that do not make contact;
   v) the reinforcing tubular jacket having opposing overlapped areas, one of the opposing overlapped areas including the first and third ends and the other of the opposing overlapped areas including the second and fourth ends; and
   vi) a binder on an absorbent interior surface of the outer layer, on the inner layer and on the reinforcing tubular jacket;
b) inserting the tubular lining into a pipe;
c) inverting the tubular lining under pressure to effect change from the pre-reversion configuration to the post-reversion configuration, wherein the binder of the inner layer is moved into contact with an inner surface of the pipe, and wherein the opposing overlapped areas enable expansion of the reinforcing tubular jacket to facilitate moving the inner layer into contact with an inner surface of the pipe; and
d) curing the binder while the lining is in the post-reversion configuration, wherein the inner layer and reinforcing tubular jacket become firm with structural and pressure resistance enabling the tubular lining to function as a passageway.

30. A tubular lining for reinforcing a pipeline comprising:
a) a lining having two configurations, a pre-reversion configuration and a post-reversion configuration, wherein said lining in the pre-reversion configuration is operable to be turned inside out so as to obtain the post-reversion configuration;
b) the pre-reversion configuration of the lining including:
   i) an outer layer having an outer circumference in the pre-reversion configuration, wherein the outer layer is made of an absorbent material, has an absorbent interior surface, and has a waterproof and/or air impervious coating on an exterior surface of the outer layer in the pre-reversion configuration;
   ii) an absorbent inner layer having an inner circumference;
   iii) a reinforcing tubular jacket with high tensile strength and/or high modulus fibers positioned between the outer layer and encircling the inner layer;
   iv) the reinforcing tubular jacket having a first jacket layer that partially encircles the inner layer, the first jacket layer having an upper surface, a lower surface, and first and second ends, wherein the first end is folded over the upper surface and over the inner layer extending a first distance towards the second end, wherein the second end is folded over the upper surface and over the inner layer extending a second distance towards the first end, and wherein the first and second ends do not make contact with one another;
   v) the reinforcing tubular jacket having a second jacket layer with third and fourth ends, wherein the second jacket layer partially encircles the first jacket layer, the second jacket layer positioned above the first and second ends of the first jacket layer with the third end folded to extend a third distance under the lower surface of the first jacket layer and under the inner layer, and the fourth end folded to extend a fourth distance under the lower surface of the first jacket layer and under the inner layer, and wherein the third and fourth ends do not make contact with one another;
   vi) the reinforcing tubular jacket have diametrically opposing overlapped areas, each of the opposing overlapped areas including four layers of material, and the reinforcing tubular jacket having an area in between said overlapping areas that has two layers of material; and
   vii) a binder that impregnates the absorbent interior surface of the outer layer, the inner layer and the reinforcing tubular jacket; and
c) wherein in the post-reversion configuration the outer layer is surrounded by the reinforcing tubular jacket that still includes opposing overlapped areas, and the reinforcing tubular jacket is surrounded by the inner layer.

31. The tubular lining of claim 30 wherein the waterproof and/or air impervious coating on an exterior surface of the outer layer is affixed to the exterior surface of the outer layer.

\* \* \* \* \*